(12) United States Patent
Kafai et al.

(10) Patent No.: US 10,803,053 B2
(45) Date of Patent: Oct. 13, 2020

(54) AUTOMATIC SELECTION OF NEIGHBOR LISTS TO BE INCREMENTALLY UPDATED

(71) Applicant: Hewlett Packard Enterprise Development LP, Houston, TX (US)

(72) Inventors: Mehran Kafai, Palo Alto, CA (US); Hongwei Shang, Palo Alto, CA (US); Omar Aguilar, Tlaquepaque (MX)

(73) Assignee: Hewlett Packard Enterprise Development LP, Houston, TX (US)

( * ) Notice: Subject to any disclaimer, the term of this patent is extended or adjusted under 35 U.S.C. 154(b) by 214 days.

(21) Appl. No.: 16/073,836

(22) PCT Filed: Dec. 3, 2015

(86) PCT No.: PCT/US2015/063768
§ 371 (c)(1),
(2) Date: Jul. 30, 2018

(87) PCT Pub. No.: WO2017/095421
PCT Pub. Date: Jun. 8, 2017

(65) Prior Publication Data
US 2019/0034479 A1 Jan. 31, 2019

(51) Int. Cl.
*G06F 16/00* (2019.01)
*G06F 16/23* (2019.01)
(Continued)

(52) U.S. Cl.
CPC ........ *G06F 16/2379* (2019.01); *G06F 16/248* (2019.01); *G06F 16/2465* (2019.01); *G06F 16/24568* (2019.01); *G06F 16/9024* (2019.01); *G06F 17/10* (2013.01)

(58) Field of Classification Search
CPC ........... G06F 16/2379; G06F 16/24568; G06F 16/2465; G06F 16/248; G06F 16/9024; G06F 17/10
See application file for complete search history.

(56) References Cited

U.S. PATENT DOCUMENTS 5,440,742 A * 8/1995 Schwanke ................. G06F 8/75
717/120
8,705,870 B2 4/2014 Wang et al.
(Continued)

OTHER PUBLICATIONS

Akoglu, L. et al; "Fast Nearest Neighbor Search on Large Time-evolving Graphs"; Apr. 16, 2014; 16 pages.
(Continued)

*Primary Examiner* — Jared M Bibbee
(74) *Attorney, Agent, or Firm* — Hewlett Packard Enterprise Patent Department

(57) ABSTRACT

Automatic selection of neighbor lists to be incrementally updated is disclosed. One example is a system including an indexing module to receive an incoming data stream, and retrieve neighbor lists for received data objects. An evaluator determines similarity measures between pairs of the received data objects. A threshold determination module determines distributions of order statistics based on the determined similarity measures and retrieved neighbor lists, and a threshold based on the distributions of order statistics. The evaluator determines additional similarity measures between a new data object in the data stream and the received data objects. A neighbor update module automatically selects a sub-plurality of the received data objects by comparing the additional similarity measures to the threshold, and determines, for each selected data object, if the respective retrieved neighbor list is to be incrementally updated based on neighborhood comparisons for the new data object and the selected data object.

14 Claims, 9 Drawing Sheets

(51) Int. Cl.
*G06F 16/901* (2019.01)
*G06F 17/10* (2006.01)
*G06F 16/2458* (2019.01)
*G06F 16/2455* (2019.01)
*G06F 16/248* (2019.01)

(56) References Cited

U.S. PATENT DOCUMENTS

| | | | | |
|---|---|---|---|---|
| 9,530,081 | B2* | 12/2016 | Kami | G06K 9/6215 |
| 2005/0031226 | A1* | 2/2005 | Sugimoto | H04N 17/004 |
| | | | | 382/286 |
| 2007/0043774 | A1* | 2/2007 | Davis | G06K 9/6254 |
| 2011/0075927 | A1 | 3/2011 | Xu et al. | |
| 2012/0096043 | A1 | 4/2012 | Stevens, Jr. | |
| 2014/0032490 | A1 | 1/2014 | Hido et al. | |
| 2014/0180831 | A1* | 6/2014 | Bax | G06Q 30/0275 |
| | | | | 705/14.71 |

OTHER PUBLICATIONS

Anastasiu, D.C. et al; "L2Knng: Fast Exact K-Nearest Neighbor Graph Construction with L2-Norm Pruning"; Oct. 19-23, 2015; 10 pages.

Cao, J. et al.; "K-NN Graph Construction Based on Markov Random Walk"; Jul. 21-24, 2015; 4 pages.

Cui Yu et al., "High-dimensional kNN joins with incremental updates"; Geoinformatica (2010), vol. 14, No. 1, pp. 55-82, Jan. 2010 See pp. 62-63 and figures 3-5.

Herald Kllapi et al., "Near Neighbor Join"; In: 2014 IEEE 30th International Conference on Data Engineering (ICDE), pp. 1120-1131, Mar. 31-Apr. 4, 2014 See p. 1126.

International Preliminary Report on Patentability received in PCT Application No. PCT/US2015/063768, dated Jun. 14, 2018, 6 pages.

International Searching Authority, The International Search Report and the Written Opinion, dated Aug. 8, 2016, PCT/US2015/063768, 9 Pgs.

Jim Z.C. Lai et al., "An agglomerative clustering algorithm using a dynamic k-nearest-neighbor list"; Information Sciences, vol. 181, No. 9, pp. 1722-1734, May 2011 See pp. 1723 and 1725.

Zhang, J. et al.; "Clustering Over High-dimensional Data Streams Based on Shared Nearest Neighbor Similarity"; Feb. 15, 2014; 8 pages.

* cited by examiner

AUTOMATIC SELECTION OF NEIGHBOR LISTS TO BE INCREMENTALLY UPDATED

BACKGROUND

Big data is data that generally exceeds the processing capacity of conventional systems. Methods for analyzing big data are of great interest in many applications, including similarity search, collaborative filtering, data compression, retrieval, clustering, and classification. Graphs may be used to represent data. For example, a nearest neighbor graph may connect each data object to data objects that are nearest (or most similar) to the data object.

DETAILED DESCRIPTION

Figure 1:
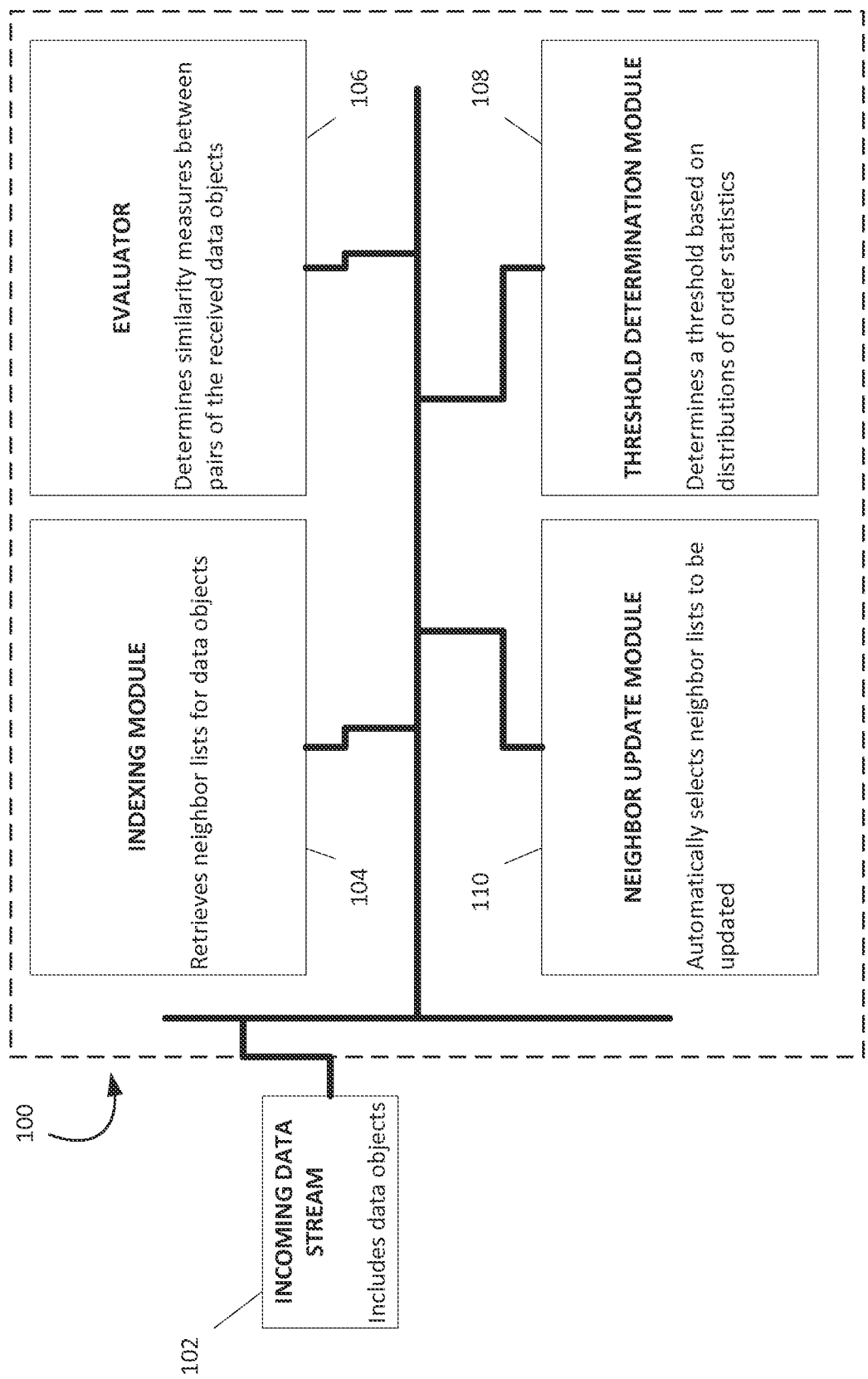
FIG. 1 is a functional block diagram illustrating one example of a system for automatic selection of neighbor lists to be incrementally updated.

Big data may be defined as data that exceeds the processing capacity of conventional systems. Methods for analyzing such data continue to grow in prominence. Graph techniques are often applied to represent and efficiently analyze big data. One such graph representation is a k-nearest neighbor ("kNN") graph. A kNN graph comprises of nodes that are data objects, and edges that connect a data object to k proximal data objects, where proximity between data objects may be based on an appropriate similarity. The proximal data objects are generally referred to as neighbors, and a collection of neighbors for a data object is referred to as a neighbor list for the data object. In some examples, the data objects in the neighbor list may be ranked or ordered based on some criterion. For example, the list may be ranked based on proximity to a first data object. Such a neighbor list will be referred to herein as a ranked neighbor list.

A kNN graph may help represent and analyze large volumes of data by revealing nearest matches to any data object. kNN graphs are extensively used in areas such as machine learning, data mining, computer vision and image processing. Applications that utilize kNN graphs include but are not limited to similarity search, collaborative filtering, data compression, retrieval, clustering, and classification. For example, large Enterprise data warehousing applications may use collaborative filtering to sort and/or search content relevant to a particular topic thread. As another example, an online retailer may use a similarity search to make product recommendations based on a particular customer's recent purchases. Also, for example, a security firm may use nearest neighbor matches to identify known persons from live video feeds.

Generally, the challenge of these applications is to maintain performance efficiency as data grows. In some examples, the data may be large volumes of rapidly streaming data, adding to the challenge of maintaining both speed and efficiency. For kNN graphs, costs associated with graph construction, for example in terms of time and resources, are considerably high for large data sets. Additionally, as a kNN graph is continually updated based on incoming data, such costs may increase considerably.

Nearest neighbor graph constructions generally use various methods such as recursive Lanczos bisection, Morton ordering, or local search. Generally, such approaches construct the nearest neighbor graph by comparing data objects directly. Approximate algorithms such as locality sensitive hashing may reduce the comparison space, but data objects in the smaller comparison space are compared directly to each other. This is generally not effective for high velocity, high volume data streams. Some hash-based techniques may be used to update the kNN graph, but these hashing techniques often display anomalies due to a similarity measure metric distortion.

Accordingly, there is a need for a kNN graph construction and updating process that may compute and update nearest neighbors in an efficient manner, especially for high velocity, high volume data streams. As described herein, an orthogonal transform based indexing system may be used to efficiently compute the nearest neighbors of a data object in a kNN graph, and then use a local search to update the data objects in the kNN graph that are likely to change after a new data object is inserted into the kNN graph. Such a system is well-adapted for streaming data scenarios and scales well with high-dimensional data as well.

Generally, when a new data object arrives, neighbor lists for data objects in the kNN graph may need to be updated. Given the large number of data objects, such a complete update may take a long time, and may not keep pace with the rate at which incoming data objects flow in. Accordingly, it is important to be able to efficiently and accurately select a subset of the data objects for which neighbor lists may be updated. Such a mechanism is described herein. For example, a continuous probability distribution may be determined based on similarity measures between data objects and their respective neighbors. A cut-off threshold may be determined based on the probability distribution. Data objects for which the neighbor lists may be updated may then be selected based on the threshold. Finally, the neighbor lists for these selected data objects may be checked for possible updates. Accordingly, the new data object may get added to the neighbor list for the selected data object.

As described in various examples herein, automatic selection of neighbor lists to be incrementally updated is disclosed. One example is a system including an indexing module to receive an incoming data stream of data objects, and retrieve neighbor lists for the received data objects. An evaluator determines similarity measures between pairs of the received data objects. A threshold determination module determines distributions of order statistics based on the determined similarity measures and retrieved neighbor lists, and determines a threshold based on the distributions of order statistics. The evaluator determines additional similarity measures between a new data object in the data stream and the received data objects. A neighbor update module automatically selects a sub-plurality of the received data objects by comparing the additional similarity measures to the threshold, and determines, for each selected data object, if the respective retrieved neighbor list is to be incrementally updated based on neighborhood comparisons for the new data object and the selected data object.

In the following detailed description, reference is made to the accompanying drawings which form a part hereof, and in which is shown by way of illustration specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

FIG. 1 is a functional block diagram illustrating one example of a system 100 for automatic selection of neighbor lists to be incrementally updated. System 100 includes an indexing module 104, an evaluator 106, a threshold determination module 108, and a neighbor update module 110. The indexing module 104 may receive, via a processor, an incoming data stream 102 of data objects, and retrieve neighbor lists for the received data objects. The term "retrieve" as used herein, may generally refer to accessing a database, via the processor, where the database may store a kNN graph, neighbor lists for data objects, a list of distributions, data indicative of similarities between data objects, and so forth. In some examples, the term retrieve may indicate that the indexing module 104 is communicatively linked to another system that is capable of incrementally updating a kNN graph, updating neighbor lists, and so forth. In some examples, the indexing module 104 may retrieve ranked neighbor lists.

In some examples, the neighbor lists are based on an orthogonal transform based indexing of an incrementally updated neighbor graph. For example, an orthogonal transform may be applied to a data object in the incoming data stream 102, and the data object may be associated with a subset of U ordered hash positions. A flow rate f for the incoming data stream 102, say S, may be measured as data objects received per second. In other words, every second, f number of data objects arrive via incoming data stream S. In some examples, hash transforms may generally be associated at a rate similar to the flow rate.

As described herein, a data object (e.g. a numerical N-dimensional vector) in the incoming data stream 102 may be associated with a subset of U ordered hash positions. In some examples, the subset may have a fixed size H. A hash position generally refers to a hash symbol located at an integer from the set $\{1, 2, \ldots, U\}$, where U is generally much larger than N, and N is much larger than H. Hashes may be generally used to provide a representation of the data object. Such a hash representation may be utilized for efficient comparisons between pairs of data objects. Generally, U may be a power of 2. For example, one instance may be H=100, N=6000, and U=$2^{18}$. The H hashes may be based on H largest coefficients provided by the orthogonal transform. Accordingly, an N-dimensional object may be projected onto a lower H-dimensional object.

In some examples, the incoming data stream 102 may include a plurality of vectors with numerical, real-valued components. System 100 may be provided with values for H and U. The integer H may be experimentally determined based on the type and number of data objects in the incoming data stream 102. Generally, U is a very large integer relative to H. In one example, U is a power of 2.

In some examples, the orthogonal transform may be a Walsh-Hadamard transform ("WHT"). A WHT is an orthogonal, non-sinusoidal transform that takes a signal as input and outputs a set of basis functions. The output functions are known as Walsh functions. A Walsh function takes two values: +1 and −1. Generally, performing an orthogonal transform on the incoming data stream 102 provides a set of coefficients associated with the incoming data stream 102. For example, after application of the Walsh-Hadamard transform to the data object, the indexing module 104 may retrieve a list of coefficients $c_1, c_2, \ldots, c_k$. Alternative forms of orthogonal transforms may be utilized as well. For example, a cosine transform may be utilized.

In some examples, the H largest coefficients, $c_{n_1}, c_{h_2}, c_{n_H}$ may be selected as the subset of hashes associated with the data object, say A. Table 1 illustrates an example association of data objects A, B, and C, with sets of hashes:

TABLE 1

| Data Term | Set of Hashes |
|---|---|
| A | {1, 5, 9, 13, 16} |
| B | {2, 3, 4, 7, 13} |
| C | {1, 5, 7, 8, 11} |

In some examples, the indexing module 104 may retrieve, via the processor, an index of U ordered key positions, where each key position is indicative of received data objects of the incoming data stream 102 that have a hash position at the key position. Table 2 illustrates an example index with U=$2^4$ key positions $\{1, 2, \ldots, 16\}$ with data objects A, B, and C, based on sets of H=5 hashes in Table 1:

TABLE 2

| 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| A |   |   |   | A |   |   |   | A |   |   |   | A |   |   | A |
|   | B | B | B |   |   | B |   |   |   |   |   | B |   |   |   |
| C |   |   |   | C |   | C | C |   |   | C |   |   |   |   |   |

As illustrated, ordered key positions 1 and 5 are indicative of received data objects A and C since these data objects have hashes at the hash positions 1 and 5, as illustrated in Table 1. Likewise, ordered key position 13 is indicative of received data objects A and B since these data objects have hashes at the hash position 13, as illustrated in Table 1.

In some examples, the indexing module 104 may update the index by inserting, via the processor, a unique identifier associated with the data object into each key position of the index that corresponds to a hash position for the data object. For example, data objects B and C may have been received by system 100 prior to receiving the data object A. Accordingly, the indexing module 104 may have updated the index by inserting unique identifiers associated with the data object A. For example, the data object A may have hashes at hash positions 1, 5, 9, 13, and 16, as illustrated in Table 1. Accordingly, the indexing module 104 may update the index by inserting unique identifiers associated with the data object A at key positions 1, 5, 9, 13, and 16, as illustrated in Table 2.

The evaluator 106 may determine, via the processor, similarity measures between pairs of the received data objects. Generally, for the purposes of this disclosure, any quantifiable distance between two data objects may be utilized as a similarity measure between the two objects. A neighbor list for a data object may be a list of additional data objects for which the similarity measures between the data object and the additional data objects is within a threshold.

In some examples, a similarity measure between two data objects may be determined based on a number of common hashes. This provides an approximate measure of nearest neighbors. An approximate nearest neighbor ("ANN") search may then be performed. For example, a received data object may be mapped to a set of hashes, and this set of hashes may be utilized to search for neighbors in the incoming data stream 102 based on the similarity measure. The similarity measure may be based on a number of overlaps between respective sets of hashes, and is indicative of proximity of the pair of data objects. Table 3 illustrates an example determination of similarity measures for pairs formed from the data objects A, B, and C:

TABLE 3

| Data Object Pair: (X, Y) | Similarity Measure: S(X, Y) |
|---|---|
| (A, B) | S(A, B) = 1 |
| (A, C) | S(A, C) = 2 |
| (B, C) | S(B, C) = 1 |

As illustrated in Table 2, the data objects A and B have key position 13 in common in their respective sets of hashes. Accordingly, the similarity measure for the pair (A,B), denoted as S(A,B) may be determined to be 1. Also, for example, as illustrated in Table 2, the data objects A and C have key positions 1 and 5 in common in their respective sets of hashes. Accordingly, the similarity measure for the pair (A,C), denoted as S(A,C) may be determined to be 2. As another example, as illustrated in Table 2, the data objects B and C have key position 7 in common in their respective sets of hashes. Accordingly, the similarity measure for the pair (B,C), denoted as S(B,C) may be determined to be 1.

In some examples, the indexing module 104 may retrieve a ranked neighbor list for the data object in a neighbor graph, where the ranking is based on the index. A neighbor graph, such as a kNN graph for stream S, is a time-varying directed graph where each vertex (representing an object) is connected to similar vertices. In some examples, each vertex may be connected to its top-k most similar vertices via a directed edge. For streaming data scenarios with a high flow rate, it may be desirable to construct an approximate kNN graph and update it after every data object arrival/insertion. For a flow rate of f, this may generally involve f updates per second. As described herein, in some examples, an approximate nearest neighbor list of k nearest neighbors for the data object may be maintained. Such a list may be incrementally updated with the arrival of each new data object in the incoming data stream 102.

Generally, when a new data object arrives (say n-th data object), a naïve approach may be to update all previous (n-1) lists for the (n-1) data objects received prior to the n-th data object. This may lead to $$n\frac{(n-1)}{2}$$

nearest neighbor list updates or $\vartheta(n^2)$ complexity for updating the kNN graph. This estimate does not take into account the time taken to retrieve the nearest neighbors.

In some examples, the indexing module 104 may maintain a database of ranked neighbor lists associated with data objects in the incoming data stream 102. In some examples, the ranked neighbor list for the data object may comprise top k nearest neighbors (e.g., based on the similarity measure) determined based on a count of overlapping hash positions in the updated index. In some examples, the ranked neighbor list for the data object may comprise a predetermined number of neighbors. In some examples, the ranked neighbor list for the data object may comprise neighbors that are approximately close to the data object. For example, neighbors may be determined to be ones that have similarity measures in the range 3 to 5. An example illustration of the ranked list is described herein with respect to a second data object.

In some examples, a hash transform may be applied to a second data object, where the second data object is received after the new data object, and a new ranked neighbor list may be determined for the second data object based on the updated index. For example, the second data object Q may be received after a new data object A, which, in turn, may be received after the received data objects B and C. The second data object Q may be associated with a subset of U ordered hash positions, say {1, 5, 7, 9, 13}. Table 4 illustrates an example updated index with U=$2^4$ key positions {1, 2, ..., 16} with data objects A, B, C, and Q:

TABLE 4

| 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| A |   |   |   | A |   |   |   | A |   |   |   | A |   |   | A |
|   | B | B | B |   |   | B |   |   |   |   |   | B |   |   |   |
| C |   |   |   | C |   | C | C |   |   | C |   |   |   |   |   |
| Q |   |   |   | Q |   | Q |   | Q |   |   |   | Q |   |   |   |

Table 5 illustrates an example list of terms associated with the second data object Q illustrated in Table 4, and the corresponding similarity measures.

TABLE 5

| 1 | 5 | 6 | 7 | 9 | 10 | 13 | Similarity Measures |
|---|---|---|---|---|----|----|---------------------|
| A | A |   |   | A |    | A  | S(Q, A) = 4         |
|   |   |   | B |   |    | B  | S(Q, B) = 2         |
| C | C |   | C |   |    |    | S(Q, C) = 3         |

As illustrated, the set of hashes associated with the second data object Q may be compared with the indexed data objects illustrated in Table 2. Based on such a comparison, index position 1 is indicative of a hash position associated with Q and index position 1 is also indicative of hash positions associated with data objects A and C. Also, for example, index position 5 is indicative of a hash position associated with Q, and index position 5 is also indicative of hash positions associated with data objects A and C. As another example, index position 13 is indicative of a hash position associated with Q, and index position 13 is also indicative of hash positions associated with data objects A and B. A frequency of occurrence for A may be determined to be 4. This is also the similarity measure for the pair Q and A. A frequency of occurrence for B may be determined to be 2. This is also the similarity measure for the pair Q and B. A frequency of occurrence for C may be determined to be 3. This is also the similarity measure for the pair Q and C.

As described herein, in some examples, a new ranked neighbor list for the second data object may be determined based on an updated index (e.g., as illustrated in Table 4). For example, based on a similarity measure of the second data object with each data object, a new ranked neighbor list may be determined for the second data object. Based on the example illustrated in Table 5, the new ranked neighbor list for the second data object Q may be determined to be A, C, and B.

Generally, the indexing module 104 may access an incrementally updated neighbor graph. The term "incremental update", as used herein, generally refers to an iterative update of at least one of the neighbor graph, the neighbor lists, the distributions of order statistics, the threshold, and so forth, as data objects arrive in the incoming data stream 102. As described herein, such an incremental update may be based on a local determination of neighborhood relations. For example, although an incoming data object may be a nearest neighbor for a large number of previously received data objects, an appropriate sub-list of these received data objects may be selected for an incremental update, the neighbor graph may be updated to reflect a change in neighborhoods for the selected data objects. In some examples, the neighbor graph may be incrementally updated by including a new data object as a neighbor for a selected sub-plurality of data objects in the ranked list, where the selection is based on neighborhood comparisons for the data object and data objects in the ranked list.

In some examples, the neighborhood comparisons may be based on comparisons between the ranked neighbor list for the data object and additional ranked neighbor lists of neighbors for data objects in the ranked list. For example, when a data object x is received by system 100, a ranked list B(x) associated with the data object x may be determined. In some examples, a list of top-m most similar data objects (e.g., highest similarity measures with respect to the data object x) may be selected from ranked list B(x), say $x_1$, $x_2$, ..., $x_m$. In some examples, each of these data objects may be associated with respective additional ranked neighbor lists, $B(x_1)$, $B(x_2)$, ..., $B(x_m)$.

In some examples, the additional ranked list $B(x_1)$ corresponding to the data object $x_1$ may comprise neighbor $x_{11}$, $x_{12}$, ..., $x_{1k}$, where $x_{11}$ is closest to $x_1$, and $x_{1k}$ is the k-th furthest away from $x_1$. A notion of similarity measure-based terms "close" and "further", as used herein, may be defined quantitatively with respect to, for example, the similarity measures determined herein. For example, two data objects that have a larger count of overlapping hashes (e.g., a larger similarity measure) may be determined to be closer than two data objects that have a smaller count of overlapping hashes (e.g., a smaller similarity measure). For example, with reference to Table 3, the data objects A and C are closer (with similarity measure 2) than the data objects A and B (with similarity measure 1).

In some examples, the neighbor graph may be updated by comparing the similarity measure from $x_1$ to the data object in $B(x_1)$ that is furthest away from $x_1$, for example, $x_{1k}$, with the similarity measure from $x_1$ to x. If the similarity measure from $x_1$ to x is greater than the similarity measure from $x_1$ to $x_{1k}$, then the neighbor update module 110 may incrementally update the neighbor graph to include x in the ranked list $B(x_1)$ corresponding to the data object $x_1$, and add x as a neighbor for $x_1$. In some examples, the neighbor update module 110 may perform such a comparison for each data object in $B(x_1)$. Accordingly, an updated ranked list may be determined for $x_1$.

In some examples, the neighbor update module 110 may repeat, concurrently, and/or iteratively, the process described with reference to $B(x_1)$ for each of the top-m data objects $x_1$, $x_2$, ..., $x_m$ in the ranked list B(x) associated with the data object x. The number of neighbor comparisons may be further reduced by using a search algorithm (e.g., a binary search) and/or an efficient data structure to store the neighbor graph, the index, and/or the ranked neighbor lists for each data object.

A critical parameter for the process, as described herein, is the parameter m, corresponding to the top-m data objects $x_1$, $x_2$, ..., $x_m$ in the ranked list B(x). In some examples, a value for the parameter m may be determined by experimenting with an accuracy of incremental update of neighbor graphs determined based on different values of the parameter m. This parameter m may be determined automatically, as described herein.

System 100 includes a threshold determination module 108 to determine distributions of order statistics based on the determined similarity measures and retrieved neighbor lists, and determine a threshold based on the distributions of order statistics. Generally, for a random sample, some interesting information may be retrieved from observations such as smallest, middle, or largest. Accordingly, the sample values in the random sample may be arranged in an increasing or decreasing order or values. Such an ordering determines an order statistics. Generally, the order statistics for a collection of random variables may be random variables as well. Accordingly, distributions of order statistics may be determined.

More formally, if the received data objects are denoted as $o_1$, $o_2$, ..., $o_n$, and the similarity measure between the data object $o_i$ and the data object $o_j$ is denoted as $\zeta_{o_i,o_j}$, we may assume that $\zeta_{o_i,o_j}$ follows a statistical distribution. In some examples the statistical distribution may be a Beta distribution Beta($\alpha,\beta$). Although the description herein refers to the Beta distribution, other statistical distributions may be utilized as well. For example, a uniform distribution may be utilized. In some examples, a normal distribution may be utilized, such as a univariate normal distribution.

The Beta distribution is a family of continuous probability distributions defined on the interval [0,1] and parametrized by two positive shape parameters. The probability density function of Beta distribution with shape parameters $\alpha, \beta$, may be given by:

$$g(x) = \frac{1}{B(\alpha, \beta)} x^{\alpha-1} (1-x)^{\beta-1}, \quad \text{(Eqn. 1)}$$

where $$B(\alpha, \beta) = \frac{\Gamma(\alpha)\Gamma(\beta)}{\Gamma(\alpha+\beta)} \quad \text{(Eqn. 2)}$$

In some examples, the evaluator 106 determines additional similarity measures between a new data object $o_{n+1}$ in the data stream 102 and the received data objects. A statistical distribution of similarities between a data object $o_i$ and data objects in its neighbor list may be determined. For example, let $o_i^{(k,n)}$ denote the k-th nearest neighbor for $o_i$ in its ranked neighbor list of n data objects. Accordingly, the similarity measure $\zeta_{o_i, o_j}$ is the k-th largest value among similarity measures $\zeta_{o_i, o_1}, \zeta_{o_i, o_2}, \ldots, \zeta_{o_i, o_n}$. Based on a probability distribution function for the Beta distribution and a density of order statistics, a probability distribution function for the distribution of $\zeta_{o_i, o_j}^{(k,n)}$ may be determined as:

$$g_{(k)}(x) = \quad \text{(Eqn. 3)}$$

$$\frac{n}{B(\alpha,\beta)} x^{\alpha-1}(1-x)^{\beta-1} \binom{n-1}{n-k} [I_x(\alpha,\beta)]^{n-k}[1-I_x(\alpha,\beta)]^{k-1},$$

where $I_x(\alpha, \beta)$ is a regularized incomplete beta function, the probability distribution function for the Beta distribution.

Figure 2:
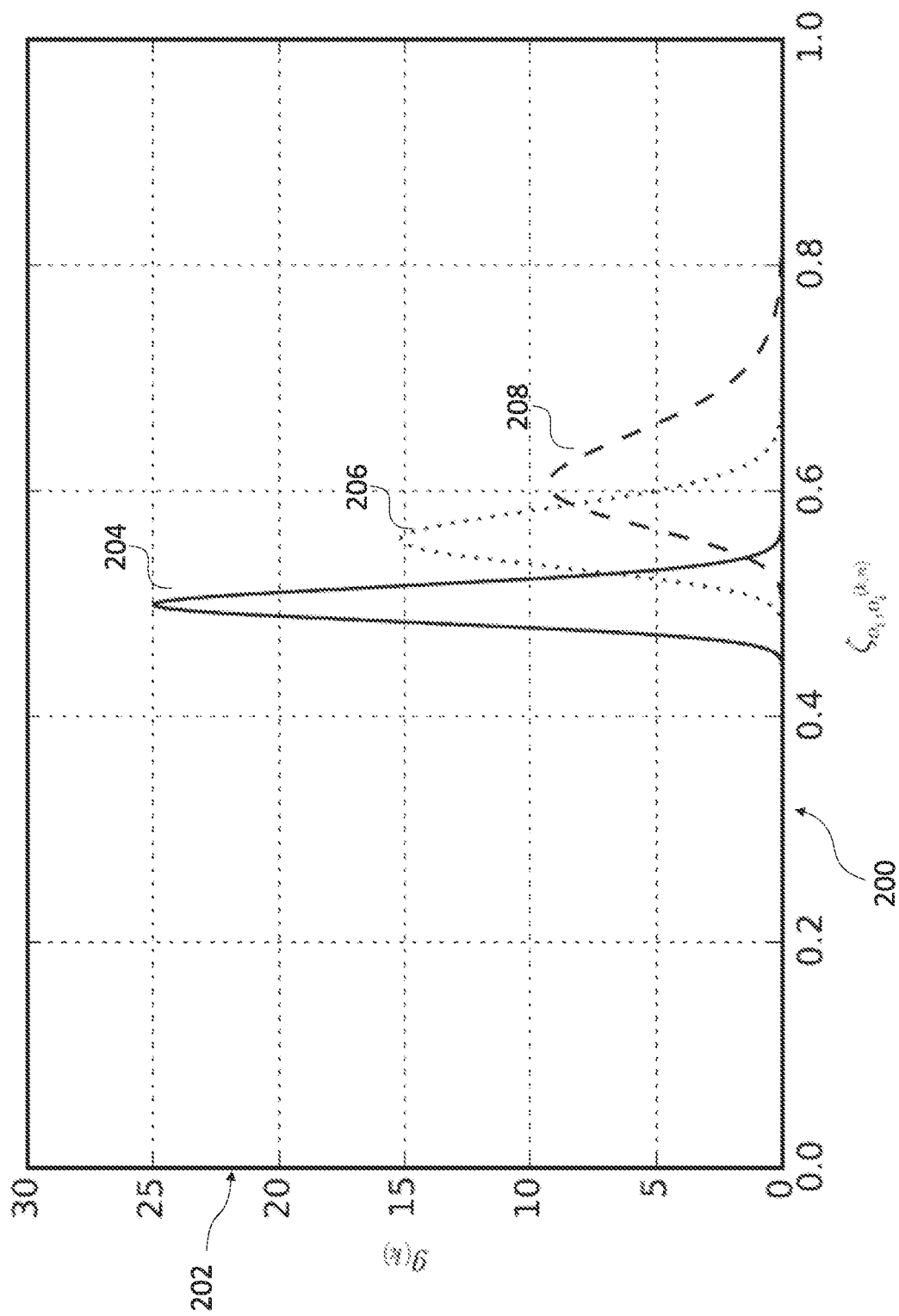
FIG. 2 illustrates one example of a probability distribution function for similarity measure based on a Beta distribution.

FIG. 2 illustrates one example of a probability distribution function for similarity measure based on a Beta distribution. In particular, FIG. 2 illustrates the probability distribution function for $\zeta_{o_i, o_j}^{(k,n)}$ based on a Beta distribution, Beta($\alpha,\beta$) with $\alpha=1$, $\beta=10$ and $n=10000$. The horizontal axis 400, or x-axis, denotes the values for whereas the vertical axis 402, or y-axis, denotes the values of $g_{(k)}$ for the k-th nearest neighbor for $o_i$ in its neighbor list. First graph 204 represents the probability distribution function for $\zeta_{o_i, o_j}^{(k,n)}$ with k=10, the second graph 206 represents the probability distribution function for $\zeta_{o_i, o_j}^{(k,n)}$ with k=3, and the third graph 208 represents the probability distribution function for $\zeta_{o_i, o_j}^{(k,n)}$ with k=1.

In some examples, distributions of order statistics may be determined based on the statistical distribution. For example, if $X_1, X_2, \ldots, X_N$ are independent and identically distributed random variables with a distribution H, with a range (a, b), then these random variables may be relabeled such that their labels correspond to arranging them in decreasing order of values, such as, for example, $$X_{(1)} \geq X_{(2)} \geq \ldots \geq X_{(N)} \quad \text{(Eqn. 4)}$$

In some examples, the distribution H may be continuous, and it may be assumed that $$X_{(1)} > X_{(2)} > \ldots > X_{(N)} \quad \text{(Eqn. 5)}$$

Generally, the order statistics, say, the r-th order statistics, may be defined as the r-th smallest value in the sequence of ordered random variables in Eqn. 4 or Eqn. 5. To automatically determine the data objects to update, the first r nearest neighbors with r largest similarity measures may be determined. For a continuous random variable X, with a probability density function h and cumulative distribution function H, it may be determined that:

$$h(x)\epsilon \approx Pr(X \in [x, x+\epsilon]) \quad \text{(Eqn. 6)}$$

$$\lim_{\epsilon \to 0} h(x)\epsilon = \lim_{\epsilon \to 0} Pr(X \in [x, x+\epsilon]) \quad \text{(Eqn. 7)}$$

$$h(x) = \lim_{\epsilon \to 0} Pr(X \in [x, x+\epsilon])/\epsilon \quad \text{(Eqn. 8)}$$

In some examples, a density $h_{(r)}(x)$ may be derived for the r-th largest statistics $X_{(r)}$, as follows:

$$\begin{aligned}
Pr(X_{(r)} \in [x, x+\epsilon]) &= Pr(\text{one of the } X\text{'s} \in [x, x+\epsilon] \text{ and} \quad \text{(Eqn. 9)}\\
&\quad \text{exactly } (N-r) \text{ of the other } X\text{'s} < x)\\
&= \sum_{i=1}^{N} Pr(X_i \in [x, x+\epsilon]) \text{ and exactly}\\
&\quad (N-r) \text{ of the other } X\text{'s} < x)\\
&= N \times Pr(X_1 \in [x, x+\epsilon]) \text{ and exactly}\\
&\quad (N-r) \text{ of the other } X\text{'s} < x)\\
&= N \times Pr(X_1 \in [x, x+\epsilon])\\
&\quad \left(\binom{N-1}{N-r}[Pr(X<x)]^{N-r}[Pr(X>x)]^{r-1}\right)
\end{aligned}$$

And, accordingly, the density $h_{(r)}(x)$ may be determined as:

$$h_{(r)}(x) = N\, h(x) \binom{N-1}{N-r} [H(x)]^{N-r}[1-H(x)]^{r-1} \quad \text{(Eqn. 10)}$$

Referring again to FIG. 1, the threshold determination module 108 determines a threshold based on the distributions of order statistics. For example, when the new data object $o_{n+1}$ in the data stream 102 is received, the indexing module 104 retrieves a neighbor list for the new data object $o_{n+1}$, say $o_{n+1}^{(1,n+1)}, o_{n+1}^{(2,n+1)}, \ldots, o_{n+1}^{(n,n+1)}$. As described herein, the evaluator 106 determines additional similarity measures between the new data object in the data stream 102 and the received data objects. In some examples, the additional similarity measures may be determined based on the index, as described herein. It may be noted that as each data object, it is incrementally added to the list of received data objects. For example, when the new data object $o_{n+1}$ is received, the list of received data objects includes $o_1, o_2, \ldots, o_n$. However, when a second data object $o_{n+2}$ is received, the list of received data objects is updated to include $o_1, o_2, \ldots, o_n, o_{n+1}$. This process may continue iteratively as each new object is received in the incoming data stream 102.

As described herein, the parameter m is representative of a number of data objects of the received data objects for which the respective neighbor lists may need to be updated when the new data object $o_{n+1}$ is received. In some examples, this may be determined by controlling a probability that a neighbor list for a data object among $o_{n+1}^{(1,n+1)}, o_{n+1}^{(2,n+1)}, \ldots, o_{n+1}^{(n,n+1)}$ fails to be updated when the respective distribution $\zeta_{o_i,o_i^{(k,n)}}$ falls below the determined threshold $\zeta_\omega$. Such a probability may be determined, for example, by comparing a similarity measure between $o_{n+1}$ and its j-th nearest neighbor $o_{n+1}^{(j,n+1)}$, and a similarity measure between $o_{n+1}^{(j,n+1)}$ and its k-th nearest neighbor before the new data object $o_{n+1}$ is received.

In some examples, the threshold may be adjusted based on a miss rate, where the miss rate is indicative of a margin of error in updating a neighbor list for a received data object when the new data object is received. For example, the threshold may be based on a miss rate $\omega$. In some examples, the miss rate $\omega$ may be input by a user via a graphical user interface on a computing device. Accordingly, the threshold $\zeta_\omega$ may be determined as:

$$Pr(\zeta_\omega > \zeta_{o_i,o_i^{(k,n)}}) = \omega, \qquad \text{(Eqn. 11)}$$

where threshold $\zeta_\omega$ may be determined based on the probability density function of $\zeta_{o_i,o_i^{(k,n)}}$.

Figure 3:
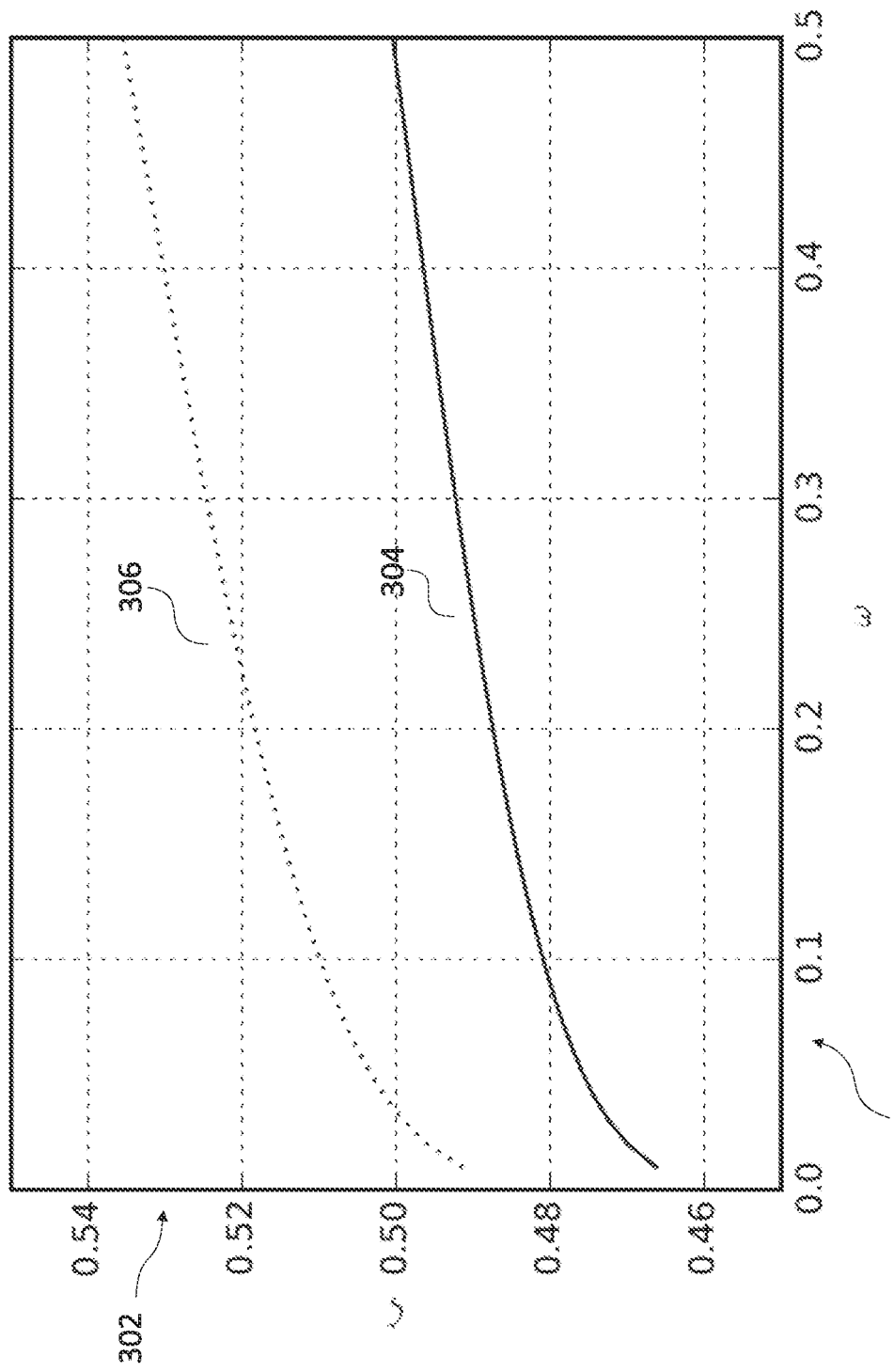
FIG. 3 illustrates one example of a graphical relation between a threshold and a miss rate.

FIG. 3 illustrates one example of a graphical relation between a threshold and a miss rate. For example, the threshold $\zeta_\omega$ is represented with respect to a miss rate $\omega$, for a Beta distribution Beta($\alpha$, $\beta$) with $\alpha$=1, $\beta$=10 and n=10000. The horizontal axis 300, or x-axis, denotes the values for the miss rate $\omega$, and the vertical axis 302, or y-axis, denotes the values of threshold $\zeta_\omega$. First graph 304 represents the threshold $\zeta_\omega$ for k=10 in Eqn. 11, and the second graph 306 represents the threshold $\zeta_\omega$ for k=5 in Eqn. 11.

As described herein, the incremental update process does not compute similarity measures and/or similarity measures between every possible pairs of potential and/or actual neighbors. Generally, a cost of a single operation may be less expensive than existing approaches that directly compare all or a subset of the data points. The process described herein does not depend on a dimensionality of x, thereby enhancing run-time efficiencies. Also, as described herein, the critical value m of neighbor lists to be updated is generally considerably smaller than the total number of data objects n.

Referring again to FIG. 1, system 100 includes the neighbor update module 110 to automatically select a sub-plurality of the received data objects by comparing the additional similarity measures to the threshold, and to determine, for each selected data object, if the respective retrieved neighbor list is to be incrementally updated based on neighborhood comparisons for the new data object and the selected data object. For example, once the threshold is determined, the additional similarity measures between the new data object in the data stream 102 and the received data objects may be compared to the threshold. For the received data objects for which the additional similarity measure is below the threshold value, the respective neighbor list is checked for a possible update. The update of the neighbor list is based on comparing the neighbor list for the new data object and the qualifying received data object, as described herein. However, instead of determining potential updates to n neighbor lists, where n is generally a very large number, the neighbor update module 110 only checks for potential updates for a relatively smaller number, m, of neighbor lists for the n received data objects.

In some examples, the threshold determination module 108 updates the threshold based on the additional similarity measures, and the neighbor update module 110 utilizes the updated threshold to determine if a second data object, received after the new data object, is to be included in retrieved neighbor lists for a second sub-plurality of data objects. For example, the parameters for the Beta distribution may be updated by including the additional similarity measures corresponding to the new data object to the determined similarity measures corresponding to the received data objects. Accordingly, the distributions for order statistics may be updated as well, and an updated threshold may be determined. Also, for example, the new data object is added to the list of received data objects. Accordingly, when the second data object is received in the incoming data stream 102, the neighbor update module 110 may select a second sub-plurality of data objects, and check neighbor lists for the data objects of the second sub-plurality of data objects for potential updating.

In some examples, the neighbor update module 110 may provide, via the processor to a computing device, an incrementally updated computer generated visual rendition of neighbor lists for data objects in the incoming data stream 102. For example, as each data object is received by system 100 and processed as described herein, the neighbor update module 110 may retrieve the updated ranked neighbor lists, and display the data objects in the neighbor graph by adding nodes for the data objects, and by adding vertices between data objects to indicate updated neighbor relations between data objects. For example, when the data object x is added to the ranked list $B(x_1)$ for $x_1$ via removal of a previous neighbor $x_{1k}$, the neighbor update module 110 may generate an incrementally updated visual rendition of the neighbor graph by adding a node representing x to the neighbor graph, and by adding an edge between x and $x_1$, indicative of an addition of x as a neighbor for $x_1$. Also, for example, the neighbor update module 110 may generate an incrementally updated visual rendition of the neighbor graph by removing an edge between $x_{1k}$ and $x_1$, indicative of a deletion of $x_{1k}$ as a neighbor for $x_1$.

Figure 4:
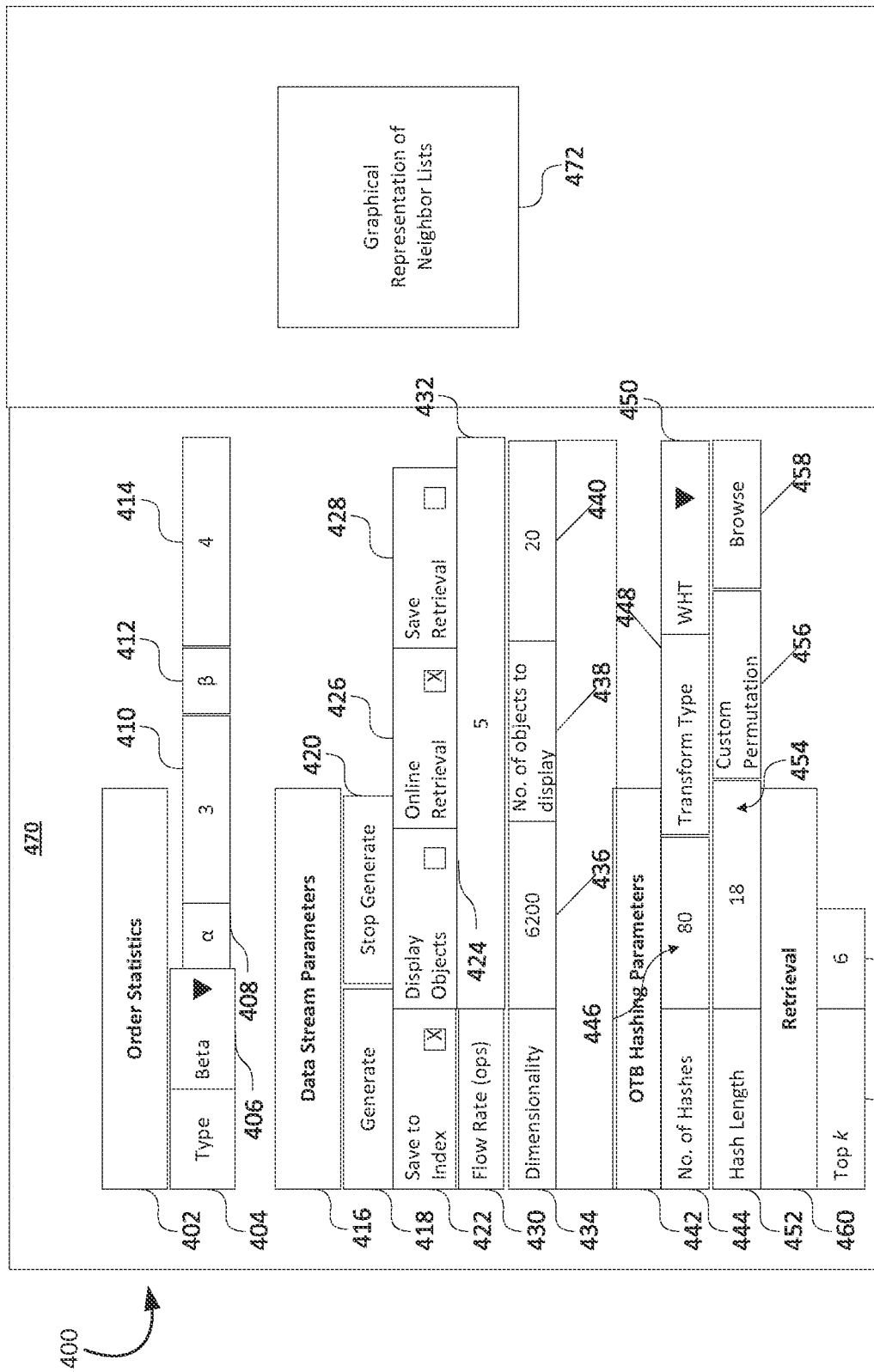
FIG. 4 is a schematic representation of an example of an incrementally updated computer generated visual rendition of neighbor lists based on an automatic selection of neighbor lists to be incrementally updated.

FIG. 4 is a schematic representation of an example of an incrementally updated computer generated visual rendition of neighbor lists based on an automatic selection of neighbor lists to be incrementally updated. In some examples, the visual rendition 400 may comprise a dashboard 470 and a graphical representation of neighbor lists 472. In some examples, the dashboard 470 may be web-based dashboard with interactive user interfaces. In some examples, the graphical representation 472 may be an incrementally updated kNN graph displaying neighbor relations. In some examples, the graphical representation 472 may be an incrementally updated collection of neighbor lists in tabular form indicative of respective rankings (based on similarity measures).

In some examples, the dashboard 470 may include user interfaces to select order statistics 402, including a statistical distribution, select data stream parameters 416, input orthogonal transform based ("OTB") hashing parameters 442, and input retrieval parameters 460.

In some examples, the user interfaces to select the order statistics 402 may include a parameter for the type 404 of statistical distribution. The type 404 of the statistical distribution may include a beta distribution, a binomial distribution, and so forth. For example, a drop-down menu may be provided to select the type of statistical distribution. As illustrated, in some examples, a beta distribution 406 may be selected and a first parameter $\alpha$ 408 may be provided, and a first user interface 410 may allow for input of a desired value for $\alpha$. For example, a value of 3 may be input for $\alpha$ in the first user interface 410. Likewise, a second parameter $\beta$ 412 may be provided, and a second user interface 414 may allow for input of a desired value for $\beta$. For example, a value of 4 may be input for $\beta$ in the second user interface 414.

In some examples, the user interfaces to select the data stream parameters 416 may include a first option 418 to generate the graphical representation 472, and a second option 420 to stop generating the graphical representation 472. Additional selectable options may be provided, for example, a selectable option to "Save to Index" 422 that updates the index, a selectable option to "Display Objects" 424 that displays the data objects, a selectable option for "Online Retrieval" 426 that retrieves data objects, and a selectable option to "Save Retrieval" 428 that saves the retrieved data objects.

Also, for example, user interfaces may be provided to input parameters for the data stream. For example, a third user interface 432 may be provided to input a flow rate 430 for the data stream. For example, a flow rate of "5" may be input, and the data stream may be received at the rate of 5 objects per second ("ops"). A fourth user interface 436 may be provided to input a value for dimensionality 434 of the data objects. For example, a value of 6200 may be input in the fourth user interface 436 indicating that the data objects may comprise 6200-dimensional vectors. A fifth user interface 440 may be provided to input a number of data objects 438 to be displayed. For example, a value of 20 may be input in the fifth user interface 440, and accordingly 20 data objects may be displayed in the graphical representation 472.

In some examples, the user interfaces to input the OTB hashing parameters 442 may include a sixth user interface 446 to input a number of hashes 444. For example, a value of 80 may be input in the sixth user interface 446, and accordingly 80 hashes may be utilized for the hash based transformations described herein. Also, for example, a drop-down menu 450 may be provided to allow selection of a transform type 448. The transform type 448 may include, for example, a discrete cosine transform ("DCT"), a Walsh-Hadamard transform ("WHT"), and so forth. A seventh user interface 454 may be provided to input a hash length 452. For example, a value of 18 may be input in the seventh user interface 454, and accordingly the hash length may be set to 18 for the hash based transformations described herein. Also, for example, a menu option 458 may be provided to select a custom permutation 456.

In some examples, the user interfaces to input the retrieval parameters 460 may include an eighth user interface 464 to input a number for the top k neighbors to be retrieved. For example, a value of 6 may be input in the eighth user interface 464, and accordingly the top 6 nearest neighbors (based on similarity measures) may be updated for each data object.

Referring again to FIG. 1, the components of system 100 may be computing resources, each including a suitable combination of a physical computing device, a virtual computing device, a network, software, a cloud infrastructure, a hybrid cloud infrastructure that may include a first cloud infrastructure and a second cloud infrastructure that is different from the first cloud infrastructure, and so forth. The components of system 100 may be a combination of hardware and programming for performing a designated visualization function. In some instances, each component may include a processor and a memory, while programming code is stored on that memory and executable by a processor to perform a designated function.

For example, the indexing module 104 is a combination of hardware and programming to receive, via the processor, the incoming data stream 102 of data objects, and retrieve neighbor lists for the received data objects. For example, the indexing module 104 may include software programming to automatically retrieve an updated hash-based index via the processor. Also, for example, the indexing module 104 may include hardware to physically store, for example, the neighbor lists. Also, for example, the indexing module 104 may include a combination of hardware and software programming to dynamically interact with the other components of system 100.

Likewise, the evaluator 106 is a combination of hardware and programming. For example, the evaluator 106 may include software programming instructions to determine, via the processor, similarity measures between pairs of the received data objects. Also, for example, the evaluator 106 may include hardware to physically store, for example, the determined similarity measures. The evaluator 106 may include a combination of hardware and software programming to dynamically interact with the other components of system 100.

Also, for example, the threshold determination module 108 is a combination of hardware and programming. For example, the threshold determination module 108 may include software programming instructions to determine distributions of order statistics based on the determined similarity measures and retrieved neighbor lists. As another example, the threshold determination module 108 may include software programming instructions to determine a threshold based on the distributions of order statistics. In some examples, the threshold determination module 108 may include software instructions to interact with a computing device to receive a miss rate, and to determine the threshold based on the miss rate. The threshold determination module 108 may include a combination of hardware and software programming to dynamically interact with the other components of system 100.

Likewise, the neighbor update module 110 is a combination of hardware and programming. For example, the neighbor update module 110 may include software programming instructions to automatically select a sub-plurality of the received data objects by comparing the additional similarity measures to the threshold. As another example, the neighbor update module 110 may include software programming instructions to determine, for each selected data object, if the respective retrieved neighbor list is to be incrementally updated based on neighborhood comparisons for the new data object and the selected data object. The neighbor update module 110 may include a combination of hardware and software programming to dynamically interact with the other components of system 100.

Generally, as described herein, the components of system 100 may include software programming and physical networks to be communicatively linked to other components of system 100. In some instances, the components of system 100 may include a processor and a memory, while programming code is stored and on that memory and executable by a processor to perform designated functions.

A computing device, as used herein, may be, for example, a web-based server, a local area network server, a cloud-based server, a notebook computer, a desktop computer, an all-in-one system, a tablet computing device, a mobile phone, an electronic book reader, or any other electronic device suitable for provisioning a computing resource to perform a unified visualization interface. The computing device may include a processor and a computer-readable storage medium.

Figure 5:
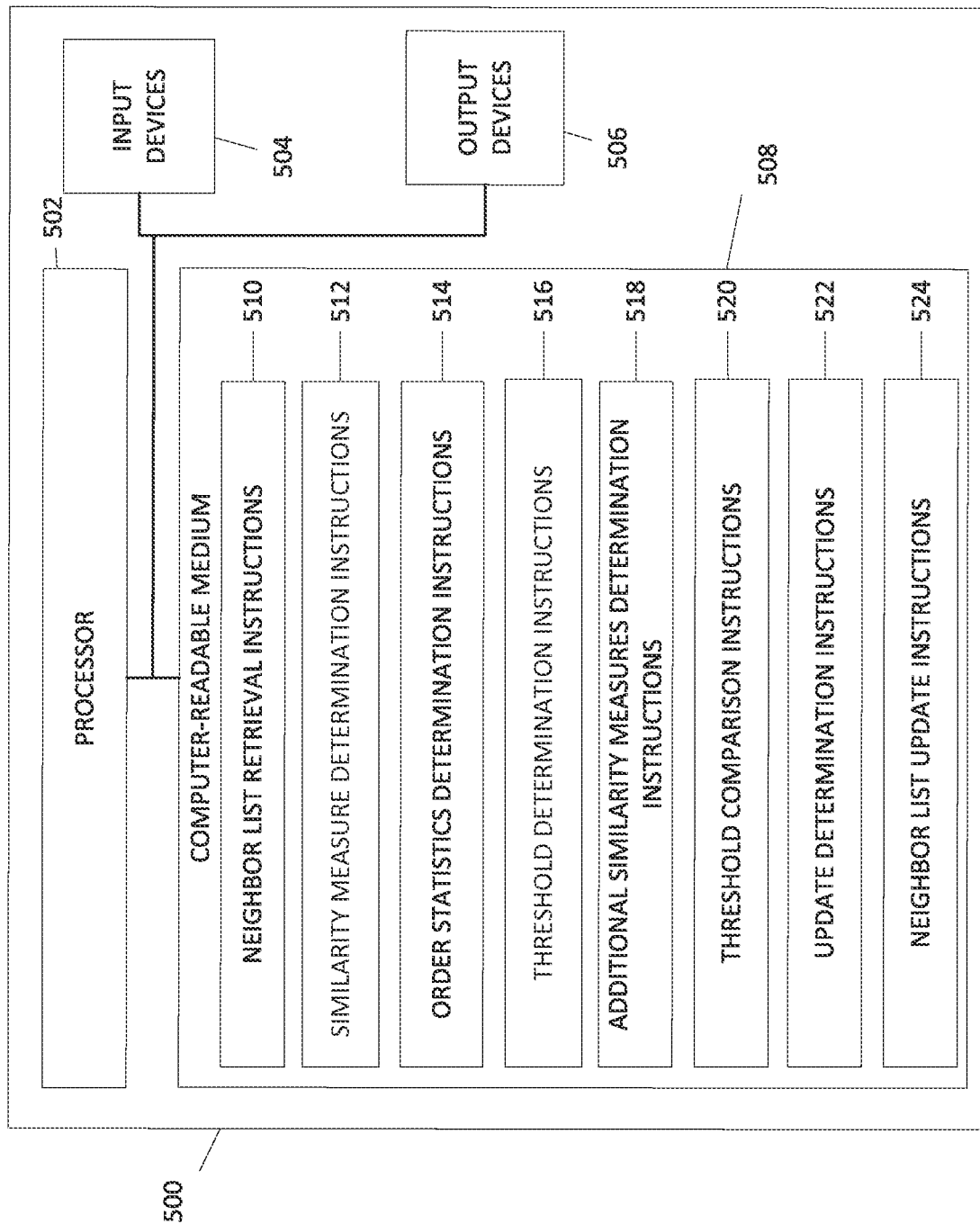
FIG. 5 is a block diagram illustrating one example of a computer readable medium for automatic selection of neighbor lists to be incrementally updated.

FIG. 5 is a block diagram illustrating one example of a computer readable medium for automatic selection of neighbor lists to be incrementally updated. Processing system 500 includes a processor 502, a computer readable medium 508, input devices 504, and output devices 506. Processor 502, computer readable medium 508, input devices 504, and output devices 506 are coupled to each other through a communication link (e.g., a bus).

Processor 502 executes instructions included in the computer readable medium 508. Computer readable medium 508 includes neighbor list retrieval instructions 510 to retrieve, via a processor, neighbor lists for received data objects in an incoming data stream. In some examples, the neighbor lists are based on an orthogonal transform based indexing of an incrementally updated neighbor graph.

Computer readable medium 508 includes similarity measure determination instructions 512 to determine, via the processor, similarity measures between pairs of the received data objects.

Computer readable medium 508 includes order statistics determination instructions 514 to determine, via the processor, distributions of order statistics based on the determined similarity measures and retrieved neighbor lists.

Computer readable medium 508 includes threshold determination instructions 516 to determine, via the processor, a threshold based on the distributions of order statistics.

Computer readable medium 508 includes additional similarity measures determination instructions 518 to determine, via the processor, additional similarity measures between a new data object in the data stream and the received data objects.

Computer readable medium 508 includes threshold comparison instructions 520 to automatically select a sub-plurality of the received data objects by comparing the additional similarity measures to the threshold.

Computer readable medium 508 includes update determination instructions 522 to determine, for each selected data object, if the respective retrieved neighbor list is to be updated based on neighborhood comparisons for the new data object and the selected data object.

Computer readable medium 508 includes neighbor list update instructions 524 to update the retrieved neighbor list for the respective data object upon a determination that the neighbor list is to be updated.

In some examples, computer readable medium 508 includes instructions to provide, via the processor to a computing device, an incrementally updated computer generated visual rendition of the neighbor lists, wherein the visual rendition is provided as the incoming data stream is received.

In some examples, computer readable medium 508 includes instructions to maintain a database of neighbor lists associated with data objects in the incoming data stream.

Input devices 504 include a keyboard, mouse, data ports, and/or other suitable devices for inputting information into processing system 500. In some examples, input devices 504, such as a computing device, are used to receive the incoming data stream. In some examples, input devices 504 may be utilized to receive the miss rate from a user via a computing device. Output devices 506 include a monitor, speakers, data ports, and/or other suitable devices for outputting information from processing system 500. In some examples, output devices 506 are used to provide the incrementally updated computer generated visual rendition of the neighbor lists.

As used herein, a "computer readable medium" may be any electronic, magnetic, optical, or other physical storage apparatus to contain or store information such as executable instructions, data, and the like. For example, any computer readable storage medium described herein may be any of Random Access Memory (RAM), volatile memory, non-volatile memory, flash memory, a storage drive (e.g., a hard drive), a solid state drive, and the like, or a combination thereof. For example, the computer readable medium 508 can include one of or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

As described herein, various components of the processing system 500 are identified and refer to a combination of hardware and programming configured to perform a designated visualization function. As illustrated in FIG. 5, the programming may be processor executable instructions stored on tangible computer readable medium 508, and the hardware may include processor 502 for executing those instructions. Thus, computer readable medium 508 may store program instructions that, when executed by processor 502, implement the various components of the processing system 500.

Such computer readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Computer readable medium 508 may be any of a number of memory components capable of storing instructions that can be executed by Processor 502. Computer readable medium 508 may be non-transitory in the sense that it does not encompass a transitory signal but instead is made up of one or more memory components configured to store the relevant instructions. Computer readable medium 508 may be implemented in a single device or distributed across devices. Likewise, processor 502 represents any number of processors capable of executing instructions stored by computer readable medium 508. Processor 502 may be integrated in a single device or distributed across devices. Further, computer readable medium 508 may be fully or partially integrated in the same device as processor 502 (as illustrated), or it may be separate but accessible to that device and processor 502. In some examples, computer readable medium 508 may be a machine-readable storage medium.

Figure 6:
FIG. 6 is a flow diagram illustrating one example of a method for automatic selection of neighbor lists to be incrementally updated.

FIG. 6 is a flow diagram illustrating one example of a method for automatic selection of neighbor lists to be incrementally updated. In some examples, such an example method may be implemented by a system such as, for example, system 100 of FIG. 1.

At 600, neighbor lists for received data objects in an incoming data stream are retrieved via a processor.

At 602, similarity measures between pairs of the received data objects are determined via the processor.

At 604, based on the determined similarity measures and retrieved neighbor lists, distributions of order statistics are determined via the processor.

At 606, a threshold based on the distributions of order statistics is determined via the processor. In some examples, the distributions of order statistics are based on a statistical distribution. In some examples, the statistical distribution is a Beta distribution.

At 608, additional similarity measures between a new data object in the data stream and the received data objects are determined via the processor. In some examples, the new data object is added to the list of received data objects. A neighbor list for the new data object may be received at 600. At 602, similarity measures between pairs of the received data objects would include the additional similarity measures. Accordingly, at 604, the order statistics would be based on the additional similarity measures as well, and at 606, the threshold is updated to incorporate the additional similarity measures. In some examples, the processor may iteratively perform such an incremental, automatic update of the order statistics and the threshold based on each incoming data object in the incoming data stream.

At 610, a sub-plurality of the received data objects is automatically selected by comparing the additional similarity measures to the threshold.

At 612, for each selected data object, it may be determined if the respective retrieved neighbor list is to be updated, based on neighborhood comparisons for the new data object and the selected data object.

At 614, an incrementally updated visual rendition of neighbor lists for data objects in the incoming data stream is generated via the processor.

Figure 7:
FIG. 7 is a flow diagram illustrating one example of a method for providing an incrementally updated computer generated visual rendition of neighbor lists based on an automatic selection of neighbor lists to be incrementally updated.

FIG. 7 is a flow diagram illustrating one example of a method for providing an incrementally updated computer generated visual rendition of neighbor lists based on an automatic selection of neighbor lists to be incrementally updated. In some examples, such an example method may be implemented by a system such as, for example, system 100 of FIG. 1.

At 700, neighbor lists for received data objects in an incoming data stream are retrieved via a processor.

At 702, similarity measures between pairs of the received data objects are determined via the processor.

At 704, based on the determined similarity measures and retrieved neighbor lists, distributions of order statistics are determined via the processor.

At 706, a threshold based on the distributions of order statistics is determined via the processor. In some examples, the distributions of order statistics are based on a statistical distribution. In some examples, the statistical distribution is a Beta distribution.

At 708, additional similarity measures between a new data object in the data stream and the received data objects are determined via the processor. In some examples, the new data object is added to the list of received data objects. A neighbor list for the new data object may be received at 700. At 702, similarity measures between pairs of the received data objects would include the additional similarity measures. Accordingly, at 704, the order statistics would be based on the additional similarity measures as well, and at 706, the threshold is updated to incorporate the additional similarity measures. In some examples, the processor may iteratively perform such an incremental, automatic update of the order statistics and the threshold based on each incoming data object in the incoming data stream.

At 710, a sub-plurality of the received data objects is automatically selected by comparing the additional similarity measures to the threshold.

At 712, for each selected data object, it may be determined if the respective retrieved neighbor list is to be updated, based on neighborhood comparisons for the new data object and the selected data object.

At 714, an incrementally updated visual rendition of neighbor lists for data objects in the incoming data stream is generated via the processor.

At 716, the incrementally updated visual rendition of the neighbor lists is provided via the processor to a computing device, where the visual rendition is provided as the incoming data stream is received.

Figure 8:
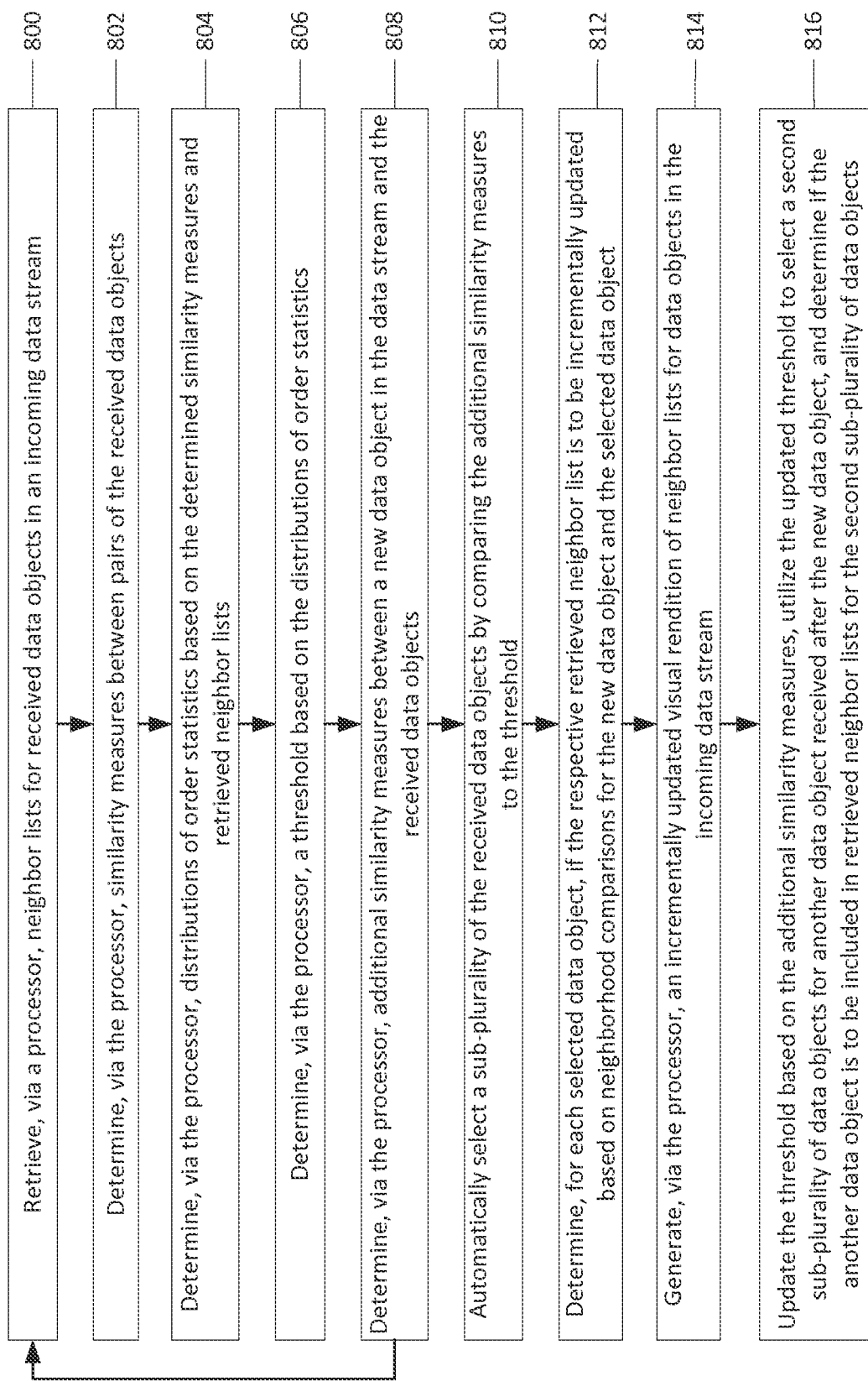
FIG. 8 is a flow diagram illustrating one example of a method for updating a threshold for an automatic selection of neighbor lists to be incrementally updated.

FIG. 8 is a flow diagram illustrating one example of a method for updating a threshold for an automatic selection of neighbor lists to be incrementally updated. In some examples, such an example method may be implemented by a system such as, for example, system 100 of FIG. 1.

At 800, neighbor lists for received data objects in an incoming data stream are retrieved via a processor.

At 802, similarity measures between pairs of the received data objects are determined via the processor.

At 804, based on the determined similarity measures and retrieved neighbor lists, distributions of order statistics are determined via the processor.

At 806, a threshold based on the distributions of order statistics is determined via the processor. In some examples, the distributions of order statistics are based on a statistical distribution. In some examples, the statistical distribution is a Beta distribution.

At 808, additional similarity measures between a new data object in the data stream and the received data objects are determined via the processor. In some examples, the new data object is added to the list of received data objects. A neighbor list for the new data object may be received at 800. At 802, similarity measures between pairs of the received data objects would include the additional similarity measures. Accordingly, at 804, the order statistics would be based on the additional similarity measures as well, and at 806, the threshold is updated to incorporate the additional similarity measures. In some examples, the processor may iteratively perform such an incremental, automatic update of the order statistics and the threshold based on each incoming data object in the incoming data stream.

At 810, a sub-plurality of the received data objects is automatically selected by comparing the additional similarity measures to the threshold.

At 812, for each selected data object, it may be determined if the respective retrieved neighbor list is to be updated, based on neighborhood comparisons for the new data object and the selected data object.

At 814, an incrementally updated visual rendition of neighbor lists for data objects in the incoming data stream is generated via the processor.

At 816, the threshold is updated based on the additional similarity measures. The updated threshold is utilized to select a second sub-plurality of data objects for a second data object received after the new data object. The processor determines if the second data object is to be included in retrieved neighbor lists for the second sub-plurality of data objects.

Figure 9:
FIG. 9 is a flow diagram illustrating one example of a method for maintaining a database of neighbor lists based on an automatic selection of neighbor lists to be incrementally updated.

FIG. 9 is a flow diagram illustrating one example of a method for maintaining a database of neighbor lists based on an automatic selection of neighbor lists to be incrementally updated. In some examples, such an example method may be implemented by a system such as, for example, system 100 of FIG. 1.

At 900, neighbor lists for received data objects in an incoming data stream are retrieved via a processor.

At 902, similarity measures between pairs of the received data objects are determined via the processor.

At 904, based on the determined similarity measures and retrieved neighbor lists, distributions of order statistics are determined via the processor.

At 906, a threshold based on the distributions of order statistics is determined via the processor. In some examples, the distributions of order statistics are based on a statistical distribution. In some examples, the statistical distribution is a Beta distribution.

At 908, additional similarity measures between a new data object in the data stream and the received data objects are determined via the processor. In some examples, the new data object is added to the list of received data objects. A neighbor list for the new data object may be received at 900. At 902, similarity measures between pairs of the received data objects would include the additional similarity measures. Accordingly, at 904, the order statistics would be based on the additional similarity measures as well, and at 906, the threshold is updated to incorporate the additional similarity measures. In some examples, the processor may iteratively perform such an incremental, automatic update of the order statistics and the threshold based on each incoming data object in the incoming data stream.

At 910, a sub-plurality of the received data objects is automatically selected by comparing the additional similarity measures to the threshold.

At 912, for each selected data object, it may be determined if the respective retrieved neighbor list is to be updated, based on neighborhood comparisons for the new data object and the selected data object.

At 914, an incrementally updated visual rendition of neighbor lists for data objects in the incoming data stream is generated via the processor.

At 916, a database of neighbor lists associated with data objects in the incoming data stream is maintained.

Examples of the disclosure provide a generalized system for automatic selection of neighbor lists to be incrementally updated. The generalized system addresses business challenges of growing costs incurred in data storage, analytic processing and data communications, when data volumes are disproportionately high compared to utility in generating valuable insight. The key proposition is to identify a smaller number, m, of neighbor lists (as compared to a relatively large number of data objects n in the kNN graph) that need to be checked for a potential update when each new data object is received. The techniques described herein are data driven since the determined distances, distributions of order statistics, threshold, etc. are updated with each incoming new data object. Accordingly, the system maintains an approximate nearest neighbor list of size k for each previously received data object after the arrival of every new data object in an incoming data stream, without directly computing the similarity/similarity measure between any pairs of data objects. This is generally achieved by maintaining an incrementally updated index, and dynamically updated ranked neighbor lists of neighbors for each data object. Since the threshold is based on a miss rate, the techniques provide a probabilistic model for accuracy-efficiency tradeoff.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. A system comprising:
   a processor; and
   a memory, wherein the memory stores computer-executable instructions to cause the processor to:
   receive an incoming data stream of data objects, and retrieve neighbor lists for the received data objects;
   determine similarity measures between pairs of the received data objects;
   determine distributions of order statistics based on the determined similarity measures and retrieved neighbor lists;
   determine a threshold based on the distributions of order statistics
   determine additional similarity measures between a new data object in the data stream and the received data objects, wherein the threshold is adjusted based on a miss rate, wherein the miss rate is indicative of a margin of error in updating a neighbor list for a received data object when the new data object is received;
   automatically select a sub-plurality of the received data objects by comparing the additional similarity measures to the threshold; and
   determine, for each selected data object, if the respective retrieved neighbor list is to be incrementally updated based on neighborhood comparisons for the new data object and the selected data object.

2. The system of claim 1, wherein the computer-executable instructions further cause the processor to:
   provide, to a computing device, an incrementally updated computer generated visual rendition of neighbor lists for data objects in the incoming data stream.

3. The system of claim 1, wherein the neighbor lists are based on an orthogonal transform based indexing of an incrementally updated neighbor graph.

4. The system of claim 1, wherein the distributions of order statistics are based on a statistical distribution.

5. The system of claim 4, wherein the statistical distribution is a Beta distribution.

6. The system of claim 1, wherein the computer-executable instructions further cause the processor to:
   update the threshold based on the additional similarity measures; and
   utilize the updated threshold to determine if a second data object, received after the new data object, is to be included in retrieved neighbor lists for a second sub-plurality of data objects.

7. A method comprising:
   retrieving, via a processor, neighbor lists for received data objects in an incoming data stream;
   determining, via the processor, similarity measures between pairs of the received data objects;
   determining, via the processor, distributions of order statistics based on the determined similarity measures and retrieved neighbor lists;
   determining, via the processor, a threshold based on the distributions of order statistics;
   determining, via the processor, additional similarity measures between a new data object in the data stream and the received data objects, wherein the threshold is adjusted based on a miss rate, wherein the miss rate is indicative of a margin of error in updating a neighbor list for the received data objects when the new data object is received;
   automatically selecting a sub-plurality of the received data objects by comparing the additional similarity measures to the threshold;
   determining, for each selected data object, if the respective retrieved neighbor list is to be updated based on neighborhood comparisons for the new data object and the selected data object; and generating, via the processor, an incrementally updated visual rendition of neighbor lists for data objects in the incoming data stream.

8. The method of claim 7, further comprising:
providing, via the processor to a computing device, the incrementally updated visual rendition of the neighbor lists, wherein the visual rendition is provided as the incoming data stream is received.

9. The method of claim 7, wherein the neighbor lists are based on an orthogonal transform based indexing of an incrementally updated neighbor graph.

10. The method of claim 7, further comprising:
updating the threshold based on the additional similarity measures;
utilizing the updated threshold to select a second sub-plurality of data objects for a second data object received after the new data object; and
determining if the second data object is to be included in retrieved neighbor lists for the second sub-plurality of data objects.

11. The method of claim 7, further comprising:
maintaining a database of neighbor lists associated with received data objects in the incoming data stream.

12. A non-transitory computer readable medium comprising executable instructions to:
retrieve, via a processor, neighbor lists for received data objects in an incoming data stream;
determine, via the processor, similarity measures between pairs of the received data objects;
determine, via the processor, distributions of order statistics based on the determined similarity measures and retrieved neighbor lists;
determine, via the processor, a threshold based on the distributions of order statistics;
determine, via the processor, additional similarity measures between a new data object in the data stream and the received data objects, wherein the threshold is adjusted based on a miss rate, wherein the miss rate is indicative of a margin of error in updating a neighbor list for the received data objects when the new data object is received;
automatically select a sub-plurality of the received data objects by comparing the additional similarity measures to the threshold;
determine, for each selected data object, if the respective retrieved neighbor list is to be updated based on neighborhood comparisons for the new data object and the selected data object; and
update the retrieved neighbor list for the respective data object upon a determination that the neighbor list is to be updated.

13. The non-transitory computer readable medium of claim 12, wherein the neighbor lists are based on an orthogonal transform based indexing of an incrementally updated neighbor graph.

14. The non-transitory computer readable medium of claim 12, further comprising instructions to:
provide, via the processor to a computing device, an incrementally updated computer generated visual rendition of the neighbor lists, wherein the visual rendition is provided as the incoming data stream is received.

* * * * *